J. A. PETERSON.
TANDEM SEAT FOR MOTOR CYCLES.
APPLICATION FILED JAN. 7, 1913.
1,088,793.
Patented Mar. 3, 1914.
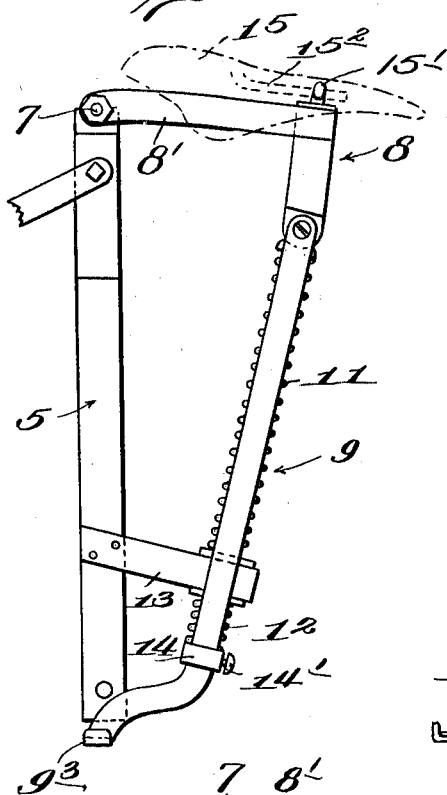
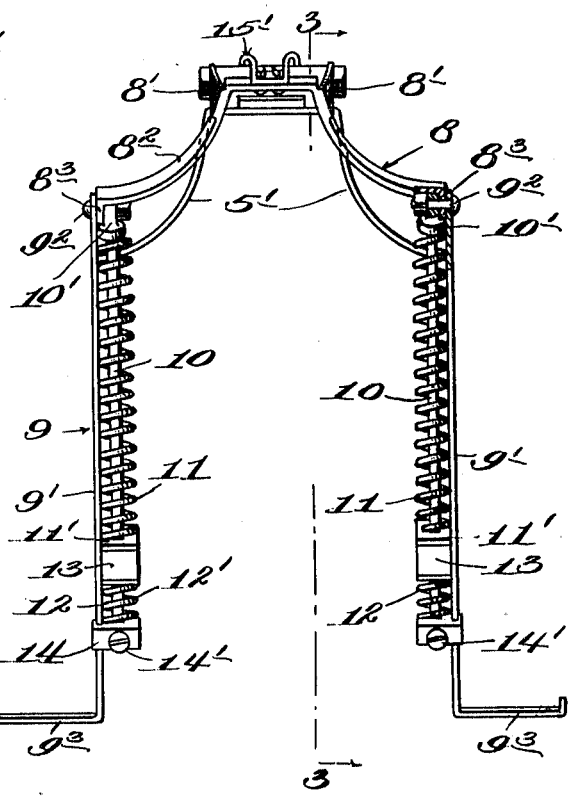
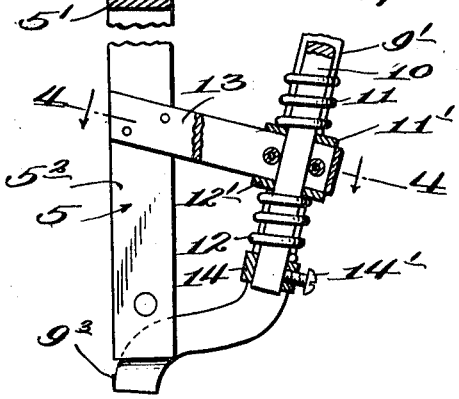
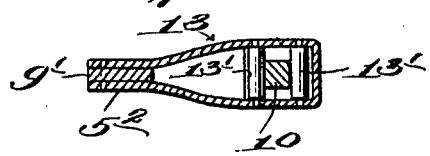
Inventor
John A. Peterson

UNITED STATES PATENT OFFICE.

JOHN ALFRED PETERSON, OF MODESTO, CALIFORNIA.

TANDEM SEAT FOR MOTOR-CYCLES.

1,088,793. Specification of Letters Patent. Patented Mar. 3, 1914.

Application filed January 7, 1913. Serial No. 740,684.

*To all whom it may concern:*

Be it known that I, JOHN ALFRED PETERSON, a citizen of the United States, residing at Modesto, in the county of Stanislaus and State of California, have invented new and useful Improvements in Tandem Seats for Motor-Cycles, of which the following is a specification.

This invention has reference to seat supports for tandem motor cycles, and it proposes certain hereinafter described improvements in or relating to the frame which carries the rear or auxiliary seat of a motor cycle of the type indicated, and in the construction and arrangement of the component parts or members of such frame, whereby the requisite yielding and cushioning mounting is provided for the seat, while, at the same time, any binding, or analogous interference of the cushion-carrying parts with each other, is avoided.

An embodiment of the invention is illustrated in the accompanying drawing, whereof:—

Figure 1 is a side elevation of the seat-carrying frame; Fig. 2 is a rear elevation thereof; Fig. 3 is a fragmental broken vertical section taken on the line 3—3 of Fig. 2; and Fig. 4 is a transverse section taken on the line 4—4 of Fig. 3.

In said drawing, 5 indicates, generally, the main frame of the support, and, as shown, has substantially, an inverted U- or fork shape. It is designed for connection in any preferred manner to the rear fork or other suitable part, (not shown), of the motor cycle, and its arched top member 5' carries upon its horizontal central portion a bearing sleeve 6 which is brazed or otherwise rigidly fastened thereto at its ends, and is likewise horizontally arranged. In the bore of this sleeve is rotatably fitted a horizontal bar 7, to whose ends are rigidly attached the front ends of the side members 8' of the seat-frame 8.

The afore-mentioned seat-frame extends rearwardly from bar 7 and comprises, in addition to the spaced side members 8', an arched member $8^2$, the upwardly curved side portions of the latter member having their upper ends integrally connected to the rear ends of the said members 8'. This arrangement, as will be understood, provides, in effect, a hinge or pivotal mounting for the seat-frame, owing to the rigid connection of the side members 8' to the ends of the bar 7, and the loose or rotatable fit of that bar in the sleeve 6, and consequently the seat-frame is enabled to swing in a vertical frame under loads.

To normally hold the seat-frame in elevated position and to cushion the same, there is connected to the arched rear member $8^2$ a supplemental frame 9, here shown as comprising a pair of depending bars 9' which are pivoted at their upper ends to horizontal pins $9^2$, their lower ends being turned laterally outward to form the foot-rests $9^3$. The pins $9^2$ are mounted in the downward-bent terminals $8^3$ of member $8^2$ and they serve, also, as supports for a pair of auxiliary bars 10 which are included in frame 9 and are provided at their upper ends with eyes 10' through which said pins loosely extend. These bars 10 are encircled by the upper and lower cushioning coil springs 11 and 12, the former of which bear at their upper ends against the bases of the eyes 10' and at their lower ends against washers 11' resting upon the upper edges of a pair of looped straps 13 that are secured at their front ends to the legs $5^2$ of the main frame 5 and extend downwardly and rearwardly from the same. The lower springs 12, in like manner, bear at their upper ends against washers 12' disposed against the under edges of said straps, and at their lower ends against collars 14, the latter being retained in adjusted position on bars 10 by set-screws 14'.

The bars 10, as shown, are preferably of rectangular cross section and they are designed to slide through the looped rear portions of the straps 13 and, also, through registering openings of corresponding shape formed in the washers 11' and 12', the collars 14 having openings through which the bars 9' extend. During their passage through the aforesaid straps, the bars 10 are engaged upon opposite sides by pairs of anti-friction rollers 13' whose reduced terminals are journaled in openings formed in the strap sides.

The seat or saddle 15, which may be of any suitable type, is mounted upon the flat central portion of the member $8^2$ of the seat-frame, and is held in place by means of a clamp 15' whose hooked ends engage over the usual braces $15^2$, said clamp being bolted or otherwise securely fastened to the aforesaid member $8^2$.

When the support, as a whole, is connected to the motor cycle, and the latter is in motion, all shocks will be taken up by the springs 11 and 12, as will be understood. At the same time, the seat frame 8 will be free to swing either upwardly or downwardly upon the bar 7 as a pivot, but during such movements no binding of the bars 10 in their guide straps 13 will be occasioned, owing to the particular construction of said straps and to the pivotal connection of the bars 9' and 10 with the pins 9².

Having described my invention, I claim:—

1. A rear seat support for tandem motor cycles and the like comprising, in combination, a vertically-disposed inverted U-shaped main frame adapted for attachment to the frame of the motor cycle; a seat-carrying frame embodying a pair of substantially-horizontal parallel side members hinged at their front ends to the ends of the top member of said main frame, and an arched rear member to which the rear ends of said side members are rigidly connected; and a cushioning frame embodying spring-pressed parallel side members hinged at their upper ends to the ends of the rear member of said seat-carrying frame.

2. A rear seat support for tandem motor cycles and the like comprising, in combination, a vertically-disposed frame adapted for attachment to the frame of the motor cycle; a rearwardly-extending seat-carrying frame hinged at its front end to the top member of said main frame and including an upwardly-arched rear member; and a cushioning frame connected to said seat-carrying frame and embodying a pair of connected, parallel bars hinged at their upper ends to each end of said arched rear member, one bar of each of said pairs having a guide connection with said main frame and a cushioning spring engaging said guide.

3. A rear seat support for tandem motor cycles and the like comprising, in combination, a vertically-disposed inverted U-shaped main frame adapted for attachment to the frame of the motor cycle; a seat-carrying frame embodying a pair of substantially-horizontal parallel side members hinged at their front ends to the ends of the top member of said main frame, and an arched rear member to which the rear ends of said side members are rigidly connected; and a cushioning frame embodying a pair of connected, parallel bars hinged at their upper ends to each end of said arched rear member, one bar of each of said pairs having a guide connection with the adjacent leg of said main frame and a cushioning spring engaging said guide.

4. A rear seat support for tandem motor cycles and the like comprising, in combination, an inverted U-shaped main frame adapted for connection to the frame of the motor cycle, each leg of said main frame having a rearwardly and downwardly inclined looped strap secured thereto and provided with a pair of spaced, parallel transverse rollers; a rearwardly-extending seat-carrying frame hinged at its front end to the top member of said main frame; and a cushioning frame embodying a pair of parallel depending bars hinged at their upper ends to each side of said seat-carrying frame at the rear end thereof, one bar of each of said pairs passing through the adjacent strap and between the rollers therein and being provided at its lower end with a collar, the other bar of each pair being engaged with the adjacent collar and having its lower end out-turned to form a foot rest, and upper and lower cushioning springs carried by the first-named bar of each pair and disposed upon opposite sides of the adjacent strap.

In testimony whereof I have hereunto set my hand in presence of two subscribing witnesses.

JOHN ALFRED PETERSON.

Witnesses:
 E. H. ZION,
 A. E. WAKEFIELD.

---

Copies of this patent may be obtained for five cents each, by addressing the "Commissioner of Patents, Washington, D. C."